(12) United States Patent
Panaioli et al.

(10) Patent No.: US 7,344,743 B2
(45) Date of Patent: Mar. 18, 2008

(54) FROZEN LAYERED PASTA PRODUCT

(75) Inventors: Sandro Panaioli, Via Appia (IT); Valerio Simeone, Via Appia (IT)

(73) Assignee: Unilever Bestfoods, North America, Division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 10/616,144

(22) Filed: Jul. 8, 2003

(65) Prior Publication Data

US 2004/0009279 A1    Jan. 15, 2004

(30) Foreign Application Priority Data

Jul. 9, 2002    (EP)    ................... 02254782

(51) Int. Cl.
*A23L 1/16*    (2006.01)
(52) U.S. Cl. .................. 426/95; 426/275; 426/557
(58) Field of Classification Search ................ 426/94, 426/275, 297, 95, 557
See application file for complete search history.

(56) References Cited

U.S. PATENT DOCUMENTS

| | | | |
|---|---|---|---|
| 3,798,343 A | 3/1974 | Vitale | |
| 4,418,085 A * | 11/1983 | Becquelet | .................. 426/297 |
| 4,711,165 A | 12/1987 | Codino | |
| 5,077,066 A * | 12/1991 | Mattson et al. | .............. 426/234 |

FOREIGN PATENT DOCUMENTS

EP    882406 A1 *    12/1998

OTHER PUBLICATIONS

SirRedhawk. Re: Desperate Request :Veggie Lasagna ?. In Google Groups. [online]. Aug. 13, 1994; 01:03:25 PST [retrieved May 24, 2004]. Retrieved from the Internet: <URL: http://groups.google.com/groups?selm=32h486%249gd%40search01.news.aol.> p. 2.*
"Freezing Lasagna". Google usenet online posting. Mar. 16, 1998. [retrieved from Internet Jan. 7, 2005]. URL<http://groups-beta.google.com/group/rec.food.cooking/browse_frm/thread/8240efed7fe82fb6#8f9f6f0bb844c846>.*
European Search Report (EP 02 25 4782), no date noted.
Translation of "Summary" ("Resume") FR 1 515 083, no date noted.

* cited by examiner

*Primary Examiner*—Arthur L. Corbin
(74) *Attorney, Agent, or Firm*—Gerard J. McGowan, Jr.

(57) ABSTRACT

The present invention relates to the field of frozen convenience meals. More particularly the invention relates to frozen layered pasta products that are conveniently reheated from frozen form for consumption.

5 Claims, 5 Drawing Sheets

FROZEN LAYERED PASTA PRODUCT

FIELD OF THE INVENTION

Figure 1:
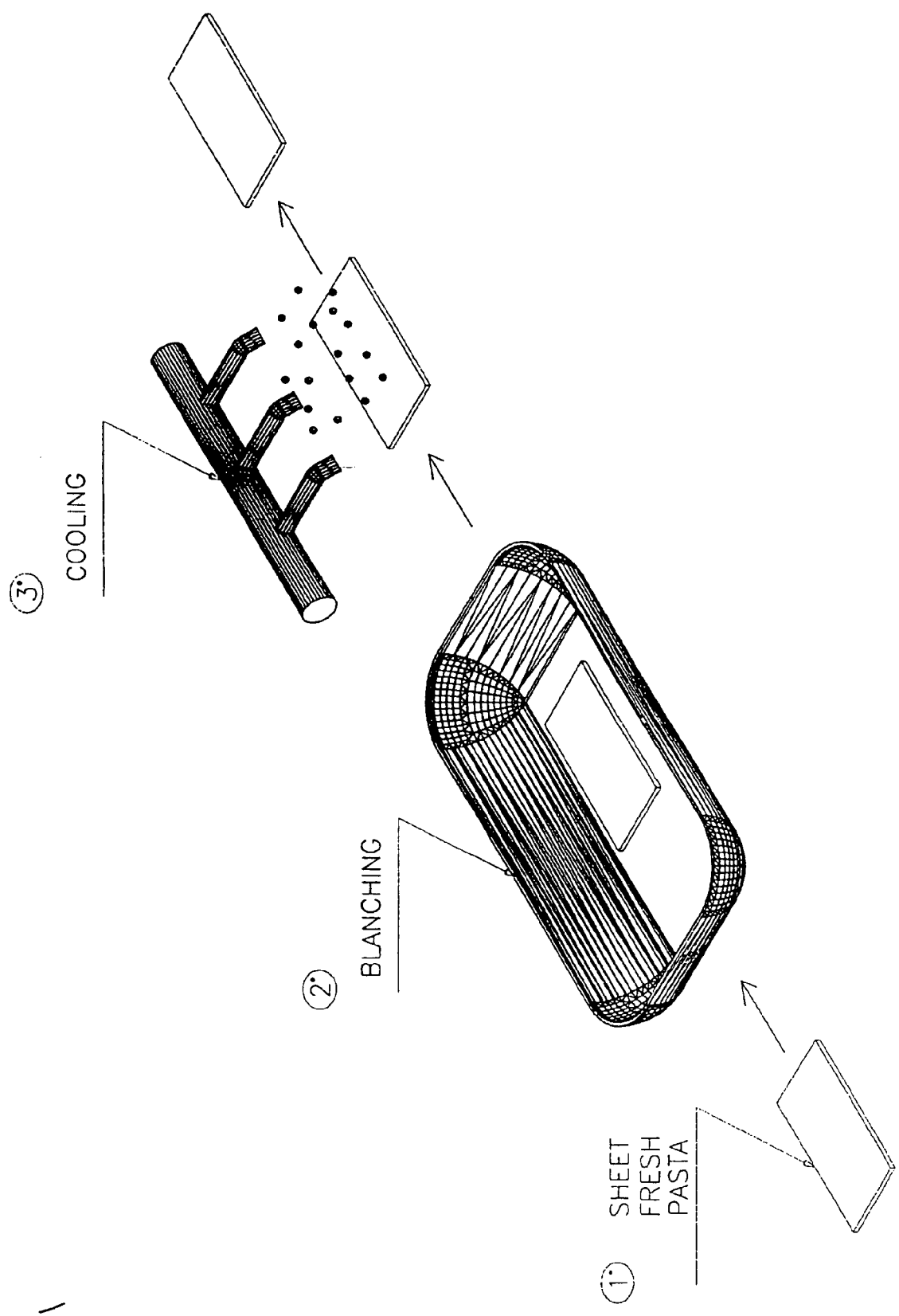

The present invention relates to the field of frozen convenience meals. More particularly the invention relates to frozen layered pasta products that are conveniently reheated from frozen for consumption.

BACKGROUND TO THE INVENTION

Convenience meals in the art comprising pasta layers typically take the form of a conventional lasagne comprising a plurality of pasta layers wherein each layer is separated by one or more sauce components. U.S. Pat. No. 4,418,085 discloses a typical lasagne meal prepared for the convenience of the consumer, comprising a unitary portion which is suitably pre-packed for preparation in a conventional oven. This type of product recreates the traditional lasagne for the consumer with minimal cooking input, however despite this advantage cooking times of such products are commonly long and detract from the overall convenience of the product.

Nestle patent EP 882 406 has sought to reduce the cooking time for a traditional style lasagne. This discloses a lasagne which is prepared from a series of disconnected frozen segments. When re-heated in a pan the segments stick together and form a united lasagne which resembles the traditional lasagne form. This product requires very viscous sauce components to effectively stick together the segments thereby relying on thickening agents which can compromise product taste and texture.

The present invention identifies a need to break away from the traditional product format of a lasagne to provide a novel and more exciting visual appearance while maintaining the flavour and textural contrasts that are enjoyed in traditional lasagne known in the art.

In particular it would be desirable to provide discrete small frozen lasagnes which have a short re-heat time and when prepared for consumption retain their integrity to allow a serving comprising a plurality of these small lasagnes to be made. Such a product allows the consumer to see layers of pasta and sauce from the discrete small lasagnes throughout the meal as opposed to a large unitary lasagne segment.

The objective technical problem therefore relates to the need to provide small frozen lasagnes which can be re-heated quickly for consumption while maintaining their integrity as discrete layered lasagnes during the re-heat process to provide a plurality of visibly layered lasagne portions on serving.

SUMMARY OF THE INVENTION

It is therefore a first object of the invention to provide a frozen pasta product comprising at least three pasta layers, said pasta layers being interleaved with one or more sauce layers, wherein at least two of said pasta layers are provided by a rectangular pasta sheet extending around the remaining layers of the product and sealed along two opposing edges. Wrapping the remaining layers in this way serves to maintain the integrity of the small lasagnes on re-heating, thereby allowing the novel lasagne dish of discrete small lasagnes with a plurality of visible layers to be served after a short re-heat time.

DETAILED DESCRIPTION OF THE INVENTION

Market research has shown that a large sector of the consumer population, while keen to take advantage of convenience meals gain further satisfaction when providing some culinary contribution to process of preparing the food for consumption. The present invention strikes a balance between the requirement for preparation convenience and the need for a satisfactory level of consumer involvement in the re-heating for consumption.

In a preferred embodiment the invention provides a frozen pasta product as described above wherein the seal, along said opposing edges of the rectangular pasta sheet and extending around the remaining layers, provides one of the pasta layers within the product. In this way a single pasta sheet can provide three pasta layers in the product, wherein the continuity of the pasta sheet provides further improvements in individual portion integrity when re-heated for consumption.

The sauce components used in the pasta product of present invention preferably comprise a combination of layers of a cheese flavoured sauce and a meat and/or vegetable flavoured sauce as this provides the contrast of flavour and texture that is expected of a lasagne. Therefore a further embodiment the invention comprises a frozen pasta product as described above wherein said one or more sauce layers comprise sauces comprising a cheese flavoured sauce and a vegetable and/or meat flavoured sauce.

It has been found that in order to provide favourable textural contrasts the ratio of pasta to sauce in the pasta product of the present invention preferably fall in the range from 30:70 to 60:40 wt/wt, most preferably 40:60 to 50:50.

In order to provide a convenient re-heat time from its frozen storage state it has been found that a pasta product of the invention should preferably be less than 75 grams, preferably less than 60 grams, most preferably in the range from 45 to 55 grams. Re-heating for this product mass can then be achieved in less than 15 minutes, as opposed to at least 40 minutes with conventional lasagne products.

A frozen pasta product according to the invention can be packaged together with pellets of additional sauce and conveniently heated together in a pan within a few minutes cooking time. A further aspect of the invention therefore comprises a packaged frozen food comprising a plurality of pasta products as described above and optionally a plurality of sauce pellets.

A further aspect of the invention relates to a process for preparing a frozen pasta product as described above. This process involves the steps of blanching and cooling a rectangular sheet of pasta. Thereafter, the pasta sheet is dosed with two differing sauce components and suitably folded and optionally cut to allow these differing sauce components to remain separated by a layer of pasta. The resulting intermediate is then hardened before cutting into portions and freezing to −18° C.

The invention will now be described with reference to the figures wherein;

FIG. 1. illustrates the blanching and cooling of a pasta sheet.

Figure 2:
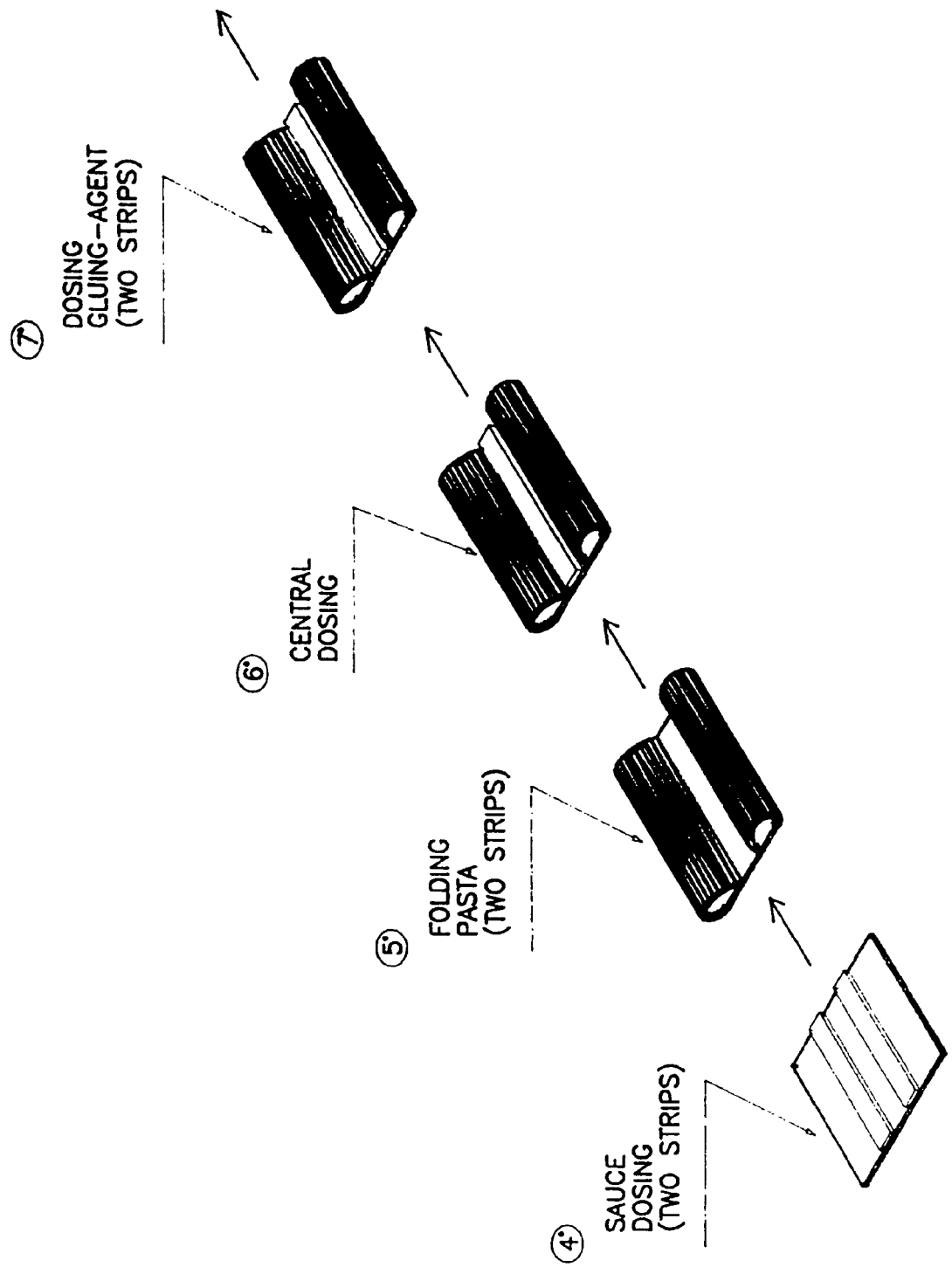

FIG. 2. provides an illustration of a first embodiment of the process of sauce dosing and folding.

Figure 3:
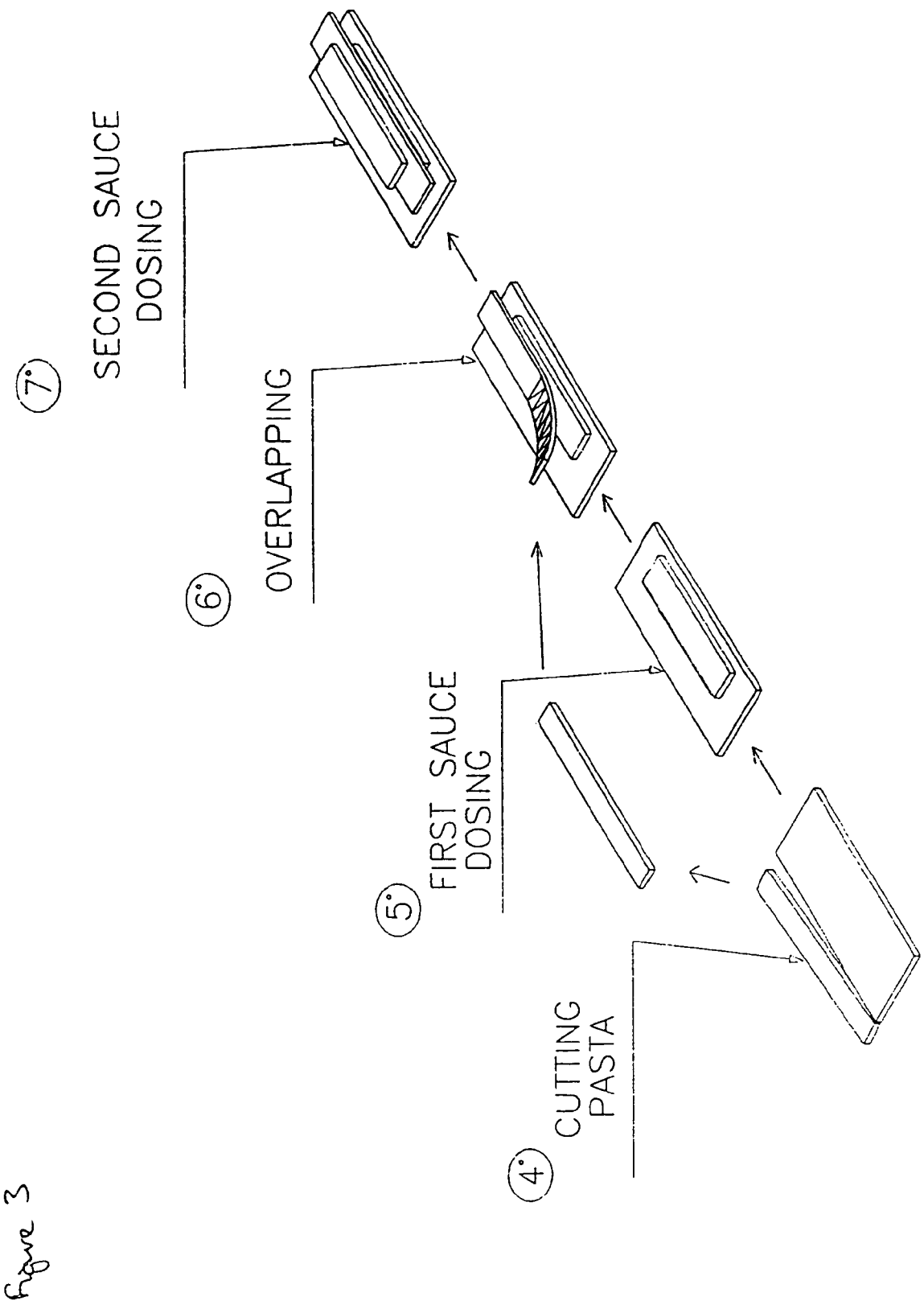

FIG. 3. provides an illustration of a second embodiment of the process with respect to sauce dosing and cutting of pasta.

Figure 4:
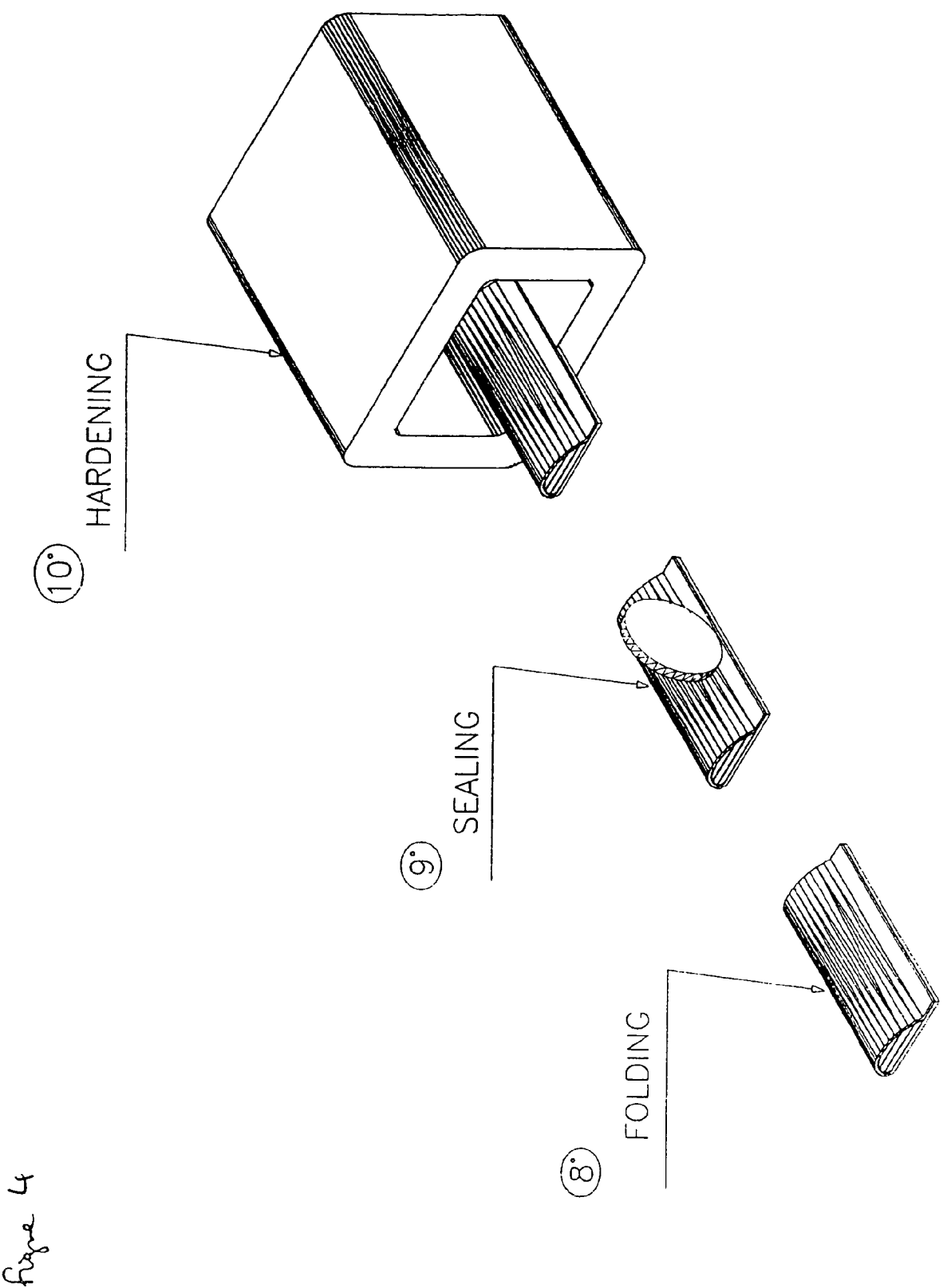

FIG. 4. provides an illustration of the folding, sealing and hardening in accordance with the second embodiment of the process of the invention.

Figure 5:
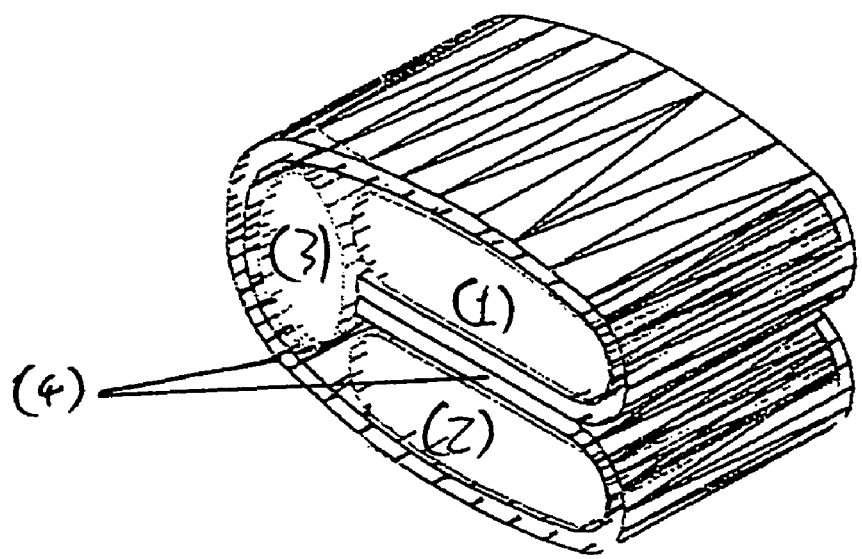

FIG. 5. illustrates the product of the first embodiment of the process, wherein (1) and (2) denote a tomato/meat flavoured sauce and (3) a cheese flavoured sauce. Pasta layers are shown at (4).

Figure 6:
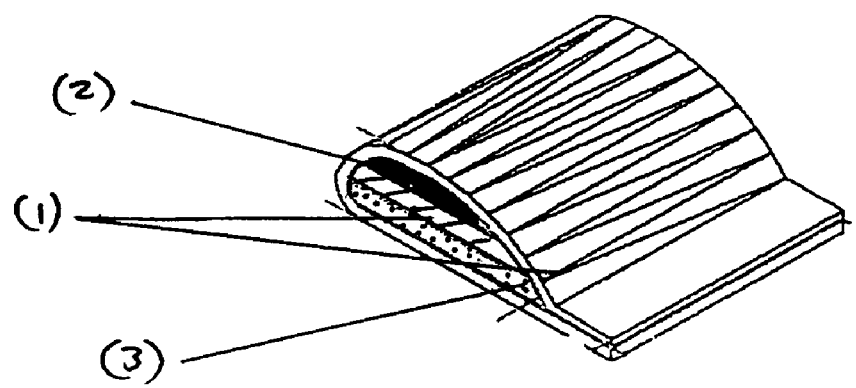

FIG. 6. illustrates the product of the second embodiment of the process, wherein pasta layers (1) divide a cheese flavoured sauce (2) and a tomato/meat flavoured sauce (3).

The process of the invention firstly requires the preparation of a pasta sheet blanching and cooling as illustrated in FIG. 1. Pasta sheets may either comprise fresh or dried pasta. This sheet (1) is exposed to boiling water or steam in a blanching means to soften the pasta (2). Where dried pasta is used the blanching step will re-hydrate the pasta to at least 190%. The pasta sheet is preferably from 0.5 to 1.5 mm in thickness, to maintain convenient re-heat times, preferably pasta structure is from 0.8 to 1.2 mm, most preferred about 1 mm.

The pasta is then cooled, suitably by passing a flow of cool air or cold water there over (3). This cooling facilitates handling of the pasta. The pasta may then undergo further processing.

As illustrated in FIG. 2, in a first embodiment two lines of a first sauce component, preferably a tomato flavoured sauce are thereafter dosed onto the pasta sheet, leaving three strips, a central strip and two outer strips, without sauce (4). The outer strips are then folded over the two sauce lines (5) and a line of a second sauce component, preferably a cheese flavoured sauce, is dosed onto the remaining central strip of the pasta sheet (6). The product is then further folded and the opposing pasta surfaces sealed together (7), optionally with a edible gluing agent. The product is then hardened, cut into portions and cooled to a storage temperature of −18° C.

As illustrated in FIG. 3, in a second embodiment the cooled pasta sheet is cut to remove a longitudinal strip (4). This strip is preferably less than one third of the width of the said total sheet. A line of a first sauce component preferably a tomato flavored sauce is then dosed along the remains of the pasta sheet, preferably along one side thereby leaving at least half of the remaining pasta sheet without sauce (5). Once the first dosing has occurred the longitudinal strip is placed on top of this first sauce layer (6) and a layer of a second sauce component preferably flavored with cheese, can be dosed on top thereof (7). As illustrated in FIG. 4, the remaining pasta sheet is then folded longitudinally in a manner that covers the layers that have been created such that the opposing edges of the pasta sheet are brought into close proximity (8). Thereafter the pasta at these edges is sealed to partially enclose the layers within (9), hardened (10), cut into portions and frozen as described above.

EXAMPLE

A rectangular length of fresh pasta sheet of approximately 1 mm thickness was blanched and subsequently cooled by an air jet.

A tomato based sauce containing the ingredients disclosed in table 1 and reduced to 90% volume was dosed onto the pasta sheet as illustrated in FIG. 2 (4). The edges of the pasta sheet were then folded towards the centre of the sheet to cover the tomato sauce. A white sauce was prepared according to table 2 and dosed onto the pasta sheet as illustrated in FIG. 2 (6).

The product was then further folded in half longitudinally and opposing pasta surfaces were sealed together. This was then hardened in a hardening tunnel and cut transversely into 50 gram portions before cooling to a storage temperature of −18° C.

TABLE 1

| Ingredient | Parts by weight |
| --- | --- |
| Tomato | 64.8 |
| Water | 20 |
| Onion | 5 |
| Garlic | 1 |
| Vegetable oil | 5 |
| Oregano | 0.5 |
| Salt | 1.2 |
| Soft wheat starch | 2.5 |

TABLE 2

| Ingredient | Parts by weight |
| --- | --- |
| Bechamel sauce (roux milk nutmeg salt starch) | 40 |
| Edamer cheese | 30 |
| Gruyere cheese | 7 |
| Mozzarella | 23 |

The invention claimed is:

1. A frozen pasta product weighing less than 75 grams and comprising at least three pasta layers which include a single rectangular pasta sheet forming at least two of said pasta layers and extending around any remaining of said at least three pasta layers, said pasta layers being interleaved with one or more sauce layers of the product and sealed along two opposing surfaces such that the integrity of the pasta product is maintained on re-heating in a pan with pellets of sauce, said pasta layers forming a top and a bottom of said frozen pasta product, said pasta layer at said top not having any sauce layer above it and said pasta at said bottom not having any sauce layer below it.

2. A frozen pasta product according to claim 1 wherein the seal along said opposing surfaces of said rectangular pasta sheet provides one of the pasta layers within the product.

3. A frozen pasta product according to claim 1 wherein said one or more sauce layers comprise a cheese flavored sauce and a vegetable and/or meat flavored sauce.

4. A frozen pasta product according to claim 3 wherein the ratio of pasta to sauce in the product is in the range from 30:70 to 60:40 wt/wt.

5. A packaged frozen food comprising a plurality of frozen pasta products each comprising at least three pasta layers comprising a single rectangular pasta sheet forming at least two of said pasta layers and extending around any remaining of said at least three pasta layers, said pasta layers being interleaved with one or more sauce layers of the product and sealed along two opposing surfaces such that the integrity of the pasta product is maintained on re-heating in a pan with pellets of sauce, said pasta layers forming a top and a bottom of said frozen pasta product, said pasta layer at said top not having any sauce layer above it and said pasta layer at said bottom not having any sauce layer below it.

* * * * *